(12) United States Patent
Lee

(10) Patent No.: US 9,413,029 B2
(45) Date of Patent: Aug. 9, 2016

(54) SECONDARY BATTERY

(71) Applicant: Samsung SDI Co., Ltd., Yongin-si, Gyeonggi-do (KR)

(72) Inventor: Jong-Ki Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 256 days.

(21) Appl. No.: 13/785,971

(22) Filed: Mar. 5, 2013

(65) Prior Publication Data

US 2014/0011062 A1    Jan. 9, 2014

(30) Foreign Application Priority Data

Jul. 4, 2012    (KR) ................ 10-2012-0072879

(51) Int. Cl.
*H01M 10/04* (2006.01)
*H01M 10/058* (2010.01)
*H01M 10/0585* (2010.01)
*H01M 10/0587* (2010.01)

(52) U.S. Cl.
CPC ...... *H01M 10/0431* (2013.01); *H01M 10/0463* (2013.01); *H01M 10/0585* (2013.01); *H01M 10/0587* (2013.01)

(58) Field of Classification Search
USPC ............................................ 429/94, 96–100
See application file for complete search history.

(56) References Cited

U.S. PATENT DOCUMENTS

| | | | |
|---|---|---|---|
| 2,487,831 A * | 11/1949 | Rupp ................ | H01M 10/0422 429/94 |
| 3,207,630 A | 9/1965 | Soloman et al. | |
| 5,300,373 A | 4/1994 | Shackle | |
| 5,552,239 A | 9/1996 | Gozdz et al. | |
| 5,635,312 A * | 6/1997 | Yanagisawa et al. | ........... 429/94 |
| 6,287,719 B1 * | 9/2001 | Bailey | .............................. 429/94 |
| 6,376,126 B1 * | 4/2002 | Faust | ..................... H01M 2/024 429/176 |
| 6,709,785 B2 * | 3/2004 | Lee | ......................... H01M 6/46 29/623.1 |
| 2003/0148178 A1 * | 8/2003 | Kaneta | .......................... 429/162 |
| 2007/0254212 A1 | 11/2007 | Viavattine | |
| 2008/0113260 A1 * | 5/2008 | Nansaka et al. | ................. 429/94 |
| 2010/0279160 A1 * | 11/2010 | Lee et al. | ......................... 429/94 |
| 2011/0129709 A1 * | 6/2011 | Ahn | .................. H01M 10/4235 429/94 |

FOREIGN PATENT DOCUMENTS

| | | | | |
|---|---|---|---|---|
| EP | 1278253 A1 | 1/2003 | | |
| EP | 2256853 A1 | 12/2010 | | |
| JP | 07-085885 | * | 3/1995 | ............ H01M 10/38 |
| KR | 2001-0082059 | 8/2001 | | |
| KR | 1020080009349 | 1/2008 | | |

OTHER PUBLICATIONS

Machine Translation of Tsukamoto JP 07-085885 (Mar. 1995).*
European Search report issued on Nov. 5, 2013 in connection with European patent application No. 13174245.4., which also claims Korean Patent Application Serial No. 10-2012-0072879 as its priority document.

* cited by examiner

*Primary Examiner* — Jonathan Crepeau
*Assistant Examiner* — Jacob Buchanan
(74) *Attorney, Agent, or Firm* — Robert E. Bushnell, Esq.

(57) ABSTRACT

A secondary battery including a first electrode assembly including first and second electrode plates stacked on each other; and a second electrode assembly including third and fourth electrode plates, wherein the second electrode assembly is wound along an outer circumference of the first electrode assembly. The secondary battery having a high energy density and capable of preventing damage of the electrode plates may be provided.

20 Claims, 10 Drawing Sheets

SECONDARY BATTERY

CLAIM OF PRIORITY

This application claims the benefit of Korean Patent Application No. 10-2012-0072879, filed on Jul. 4, 2012, in the Korean Intellectual Property Office, the disclosures of which are incorporated herein in their entirety by reference.

BACKGROUND OF THE INVENTION

1. Field of the Invention

One or more embodiments of the present invention relate to a secondary battery.

2. Description of the Related Art

As technologies for mobile devices such as mobile phones and notebook computers are developed and production of the mobile devices increases, a demand for secondary batteries as energy sources is sharply increased. Recently, secondary batteries have been actively developed as replacement energy sources of fossil fuels for use in electric vehicles, hybrid vehicles, etc.

As an example of a secondary battery, the secondary battery is configured such that an electrode assembly manufactured into a jelly roll is pressed and is accommodated in a case. Here, when an electrode plate has a high loading level, the electrode plate inside the jelly roll has an extremely small bending curvature, and thus the electrode plate is almost folded, and may be also broken. A loading level of an electrode plate needs to be increased to heighten an energy density of a secondary battery, but there is a limitation in increasing the loading level of the electrode plate due to damage of the electrode plate.

SUMMARY OF THE INVENTION

One or more embodiments of the present invention include a secondary battery having a high energy density in which an electrode plate is prevented from being damaged.

Additional aspects will be set forth in part in the description which follows and, in part, will be apparent from the description, or may be learned by practice of the presented embodiments.

According to one or more embodiments of the present invention, a secondary battery includes a first electrode assembly including first and second electrode plates stacked on each other and a second electrode assembly including third and fourth electrode plates, wherein the second electrode assembly is wound along an outer circumference of the first electrode assembly. The first electrode assembly may also include a first separator interposed between the first and second electrode plates, and the second electrode assembly further comprises a second separator wound together with the third and fourth electrode plates. The second separator may forms an innermost turn in the second electrode assembly to surround the outer circumferential surface of the first electrode assembly, and the third electrode plate and the fourth electrode plate are sequentially disposed on the outside of the second separator, wherein the second electrode assembly further comprises a third separator interposed between the third and fourth electrode plates.

The electrode plates facing each other of the first electrode assembly and the second electrode assembly may have opposite polarities. The second electrode plates may be disposed on both outer sides of the first electrode assembly, and the third electrode plate may be disposed adjacent to and outside of the second separator that forms an innermost turn of the second electrode assembly has an opposite polarity to that of the second electrode plates. The second electrode plate may be a positive electrode, and the third electrode plate may be a negative electrode.

The electrodes plates facing each other of the first electrode assembly and the second electrode assembly may have the same polarity. The second electrode plates may be disposed on both sides of the first electrode assembly, and the third electrode plate may be disposed adjacent to and outside of the second separator for forming the innermost turn of the second electrode assembly has the same polarity to that of the second electrode plate. The second and third electrode plates may be negative electrodes.

A corner portion of the second electrode assembly may surround an edge portion of the first electrode assembly, and a minimum curvature radius may be formed throughout the entire trace of the second electrode assembly. A stacked thickness of the first electrode assembly may be formed to correspond to about ten to thirty times an electrode plate thickness of an average of the third electrode plate and the fourth electrode plate of the second electrode assembly. The stacked thickness of the first electrode assembly may be less than a thickness of the second electrode assembly. The thickness of the second electrode assembly may correspond to the sum of partial thicknesses of the second electrode assembly in a stacking direction of the first electrode assembly The first and second electrode assemblies may include connection members having a first polarity and may be arranged at first sides of the first and second electrode assemblies and connection members having a second polarity and may be arranged at second and opposite sides of the first and second electrode assemblies. The first and second electrode assemblies may be connected to each other in parallel by commonly binding together the connection members having the first polarity of the first and second electrode assemblies together and by commonly binding together the connection members having the second polarity of the first and second electrode assemblies together.

The connection members having the first polarity may include a non-coated portion of the first electrode plate arranged at the first side of the first electrode assembly and a non-coated portion of the third electrode plate arranged at the first side of the second electrode assembly. The connection members having the second polarity may include a non-coated portion of the second electrode plate arranged at the second and opposite side of the first electrode assembly and a non-coated portion of the fourth electrode plate arranged at the second and opposite side of the second electrode assembly. The secondary battery may also include a first collecting member coupled to the connection members having the first polarity and a second collecting member coupled to the connection members having the second polarity. The secondary battery may also include a case accommodating the first and second electrode assemblies, a first electrode terminal that is electrically connected to the first collecting member and is drawn outside of the case and a second electrode terminal that is electrically connected to the second collecting member and is drawn outside of the case and being made of polyethylene or polypropylene.

The second electrode assembly may be separated from the first electrode assembly by only a polymer separator. The polymer separator also may be an innermost winding of the second electrode assembly. The first through fourth electrode plates may include connection members that protrude beyond separators at both a top and a bottom of the first and second electrode assemblies.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Now, an exemplary embodiment according to the present invention will be described in detail with reference to the accompanying drawings. Expressions such as "at least one of," when preceding a list of elements, modify the entire list of elements and do not modify the individual elements of the list.

Figure 1:
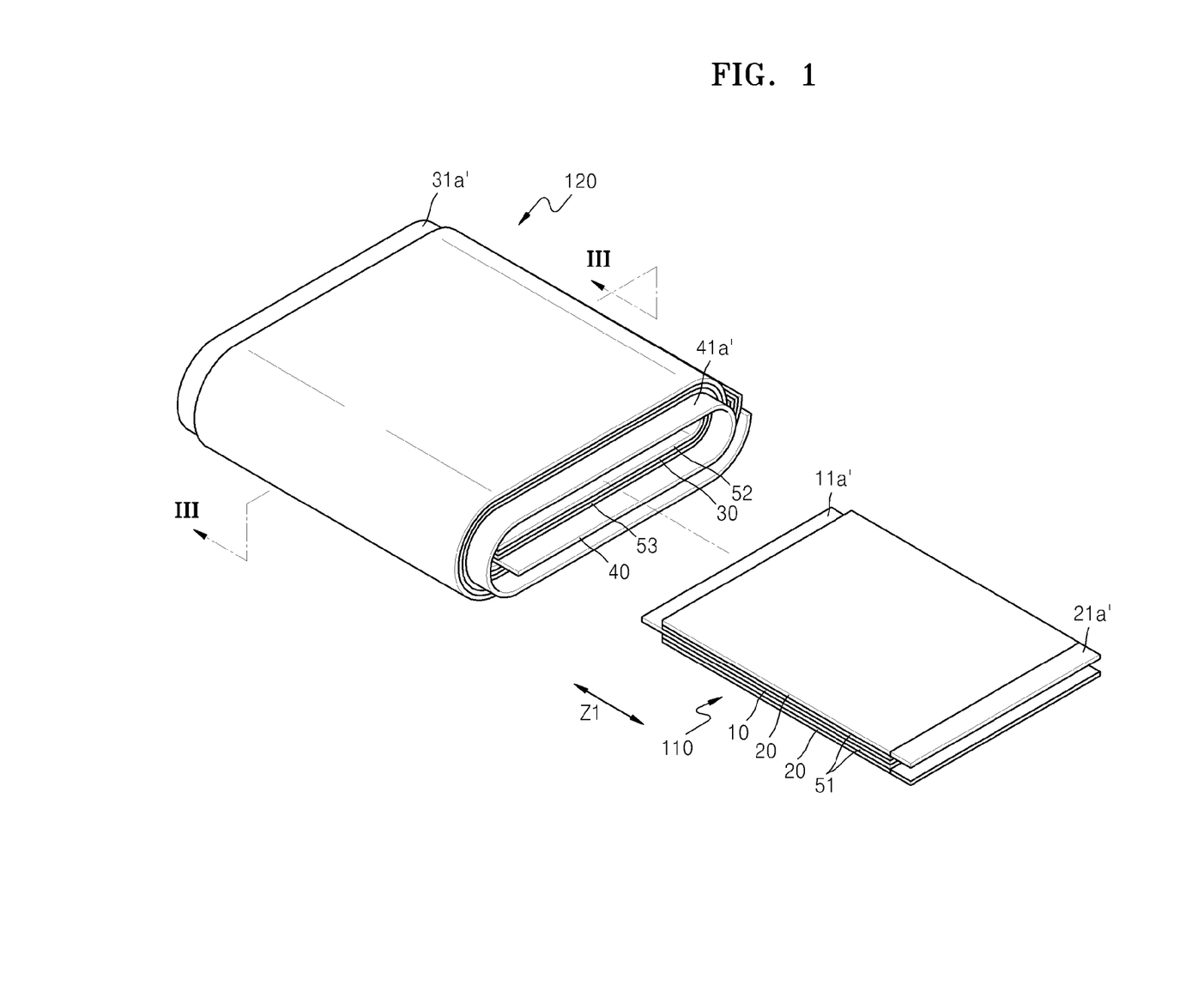
FIG. 1 is a perspective view of a secondary battery according to an embodiment of the present invention.

FIG. 1 is a perspective view of a secondary battery according to an embodiment of the present invention. Referring to FIG. 1, the secondary battery includes a first electrode assembly 110, and a second electrode assembly 120 wound in a roll form along an outer circumference of the first electrode assembly 110.

The first electrode assembly 110 may include a connection member 11a' that has a first polarity and is formed at one side of the first electrode assembly 110 in a width direction (in a Z1-axis direction), and a connection member 21a' that has a second polarity and is formed at the other side of the first electrode assembly 110. Similarly, the second electrode assembly 120 may include a connection member 31a' that has a first polarity and is formed at one side of the second electrode assembly 120 in the width direction (in the Z1-axis direction), and a connection member 41a' that has a second polarity and is formed on the other side of the second electrode assembly 120.

The first and second electrode assemblies 110 and 120 are connected to each other in parallel by commonly binding together the connection members 11a' and 31a' having the first polarity and by commonly binding together the connection members 21a' and 41a' having the second polarity. The connection members 11a' and 31a' having the first polarity and the members 21a' and 41a' having the second polarity may respectively form negative and positive electrodes that form two ends of a flow of charging/discharging power.

In detail, the connection members 11a' and 31a' having the first polarity of the first and second electrode assemblies 110 and 120 may be commonly bound at one side in the width direction (in the Z1-axis direction) of the first and second electrode assemblies 110 and 120 to form one polarity, for example, a negative electrode. Also, the connection members 21a' and 41a' having the second polarity of the first and second electrode assemblies 110 and 120 may be commonly bound at the other side of the connection members 11a' and 31a' in the width direction (in the Z1-axis direction) of the first and second electrode assemblies 110 and 120 to form an opposite polarity, for example, a positive electrode.

The connection members 11a' and 31a' having the first polarity and the connection members 21a' and 41a' having the second polarity may be formed as parts, for example, non-coated portions, of first to fourth electrode plates 10, 20, 30, and 40 for forming the first and second electrode assemblies 110 and 120. As described below, first and second collecting members (not shown) may be coupled to the connection members 11a' and 31a' having the first polarity and the connection members 21a' and 41a' having the second polarity, respectively. For example, the connection members 11a' and 31a' having the first polarity and disposed at one sides of the first and second electrode assemblies 110 and 120 may be connected to the first collecting member to form a charging/discharging path, and the members 21a' and 41a' having the second polarity and disposed at the other sides of the first and second electrode assemblies 110 and 120 may be connected to the second collecting member to form a charging/discharging path.

The second electrode assembly 120 is wound in a roll form along an outer circumference of the first electrode assembly 110. The first electrode assembly 110 forms a winding center of the second electrode assembly 120. Also, the first electrode assembly 110 may maintain a curvature radius of the second electrode assembly 120 above an appropriate level so as to prevent the third and fourth electrode plates 30 and 40 from being damaged due to forced deformation applied to the second electrode assembly 120, for example, breakage of the third and fourth electrode plates 30 and 40 or a loss of an electrode active material during winding of the second electrode assembly 120 or during pressing of the second electrode assembly 120 into an oval after the winding.

Figure 2:
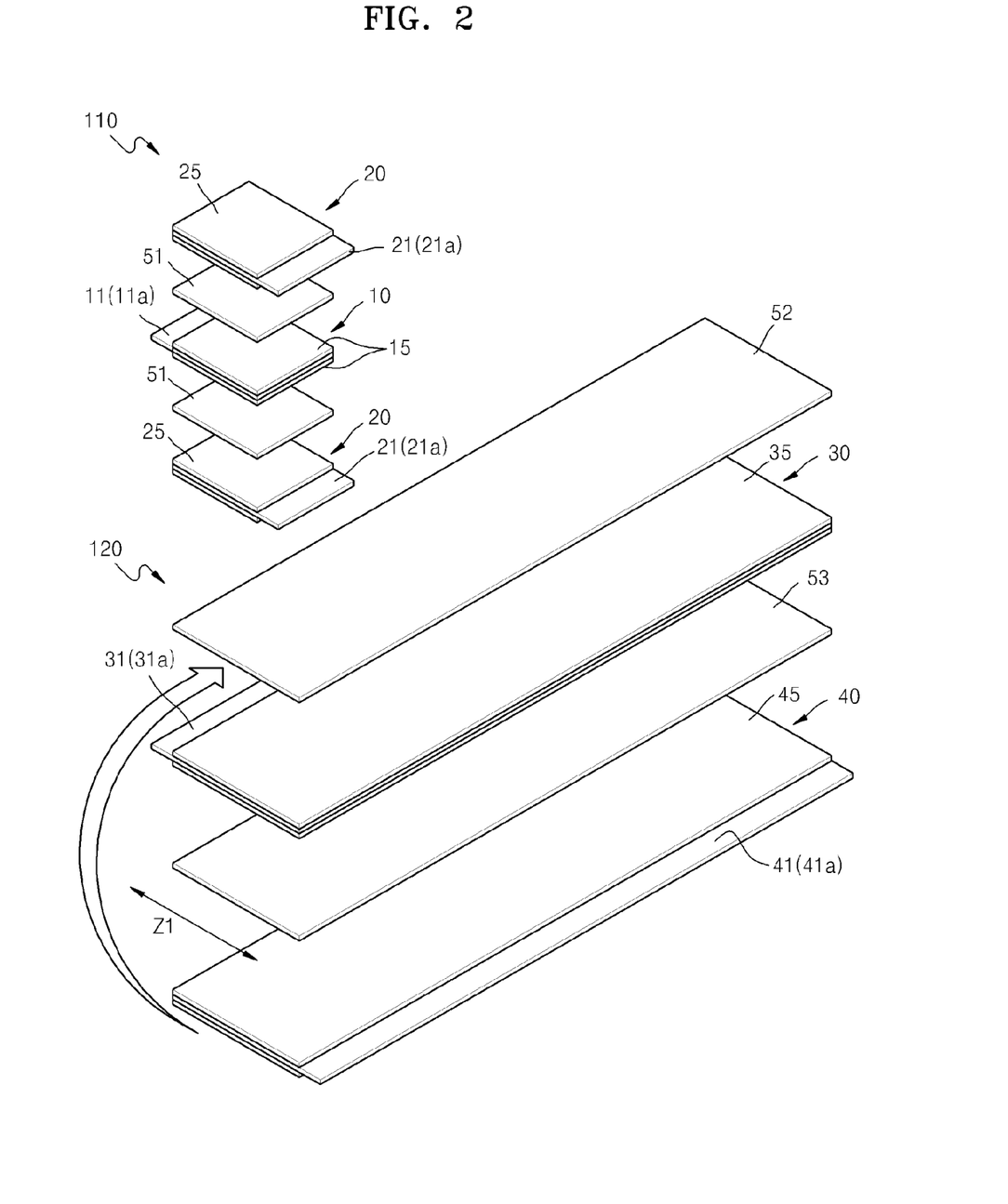
FIG. 2 is an exploded perspective view of the secondary battery of FIG. 1.

FIG. 2 is an exploded perspective view of the secondary battery of FIG. 1. Referring to FIG. 2, the first electrode assembly 110 may be formed by alternately stacking the first and second electrode plates 10 and 20 by interposing a first separator 51 therebetween. In other words, the first and second electrode plates 10 and 20 formed to have a predetermined size may be alternately stacked by interposing the first separator 51 therebetween. The first separator 51 may separate the first and second electrode plates 10 and 20 from each other, and may prevent an internal short circuit between positive and negative electrodes.

The first electrode assembly 110 forms a winding center of the second electrode assembly 120. Also, the first electrode assembly 110 may maintain a curvature radius of the second electrode assembly 120 above an appropriate level so as to prevent the second electrode assembly 120 from being damaged during winding of the second electrode assembly 120 or during pressing of the second electrode assembly 120 after the winding.

The first electrode plate 10 may include a first electrode collector 11, and a first electrode active material 15 formed on at least one surface of the first electrode collector 11. The first electrode collector 11 provides a transfer path of charges generated from the first electrode active material 15 and supports the first electrode active material 15.

The first electrode active material 15 may be formed by dispersing an electrode mixture including an electrode active material, a binder, a conductive material, etc. in a solvent to make a slurry, and coating the slurry on the at least one surface of the first electrode collector 11, and then drying and compressing the slurry.

A non-coated portion 11a, in which the first electrode active material 15 is not formed, may be arranged on the first electrode plate 10. The first electrode active material 15 is not formed in, for example, at least one end of the first electrode plate 10 in the width direction (in the Z1 direction) of the first electrode plate 10, and thus the non-coated portion 11a in which the first electrode collector 11 is exposed may be formed.

The non-coated portion 11a may form a connection member 11a' (see FIG. 1) having a first polarity, wherein charges of the first electrode plate 10 may be discharged to the outside via the connection member 11a'. According to another embodiment of the present invention, an electrode tap (not shown) may further be formed on the non-coated portion 11a, and the electrode tap may form the connection member 11a' having the first polarity.

The second electrode plate 20 may include a second electrode collector 21, and a second electrode active material 25 formed on at least one surface of the second electrode collector 21. The second electrode collector 21 provides a transfer path of charges generated from the second electrode active material 25 and supports the second electrode active material 25.

The second electrode active material 25 may be formed by dispersing an electrode mixture including an electrode active material, a binder, a conductive material, etc. in a solvent to make a slurry, and coating the slurry on the at least one surface of the second electrode collector 21, and then drying and compressing the slurry.

A non-coated portion 21a, in which the second electrode active material 25 is not formed, may be formed in the second electrode plate 20. The second electrode active material 25 is not formed in, for example, at least one end of the second electrode plate 20 in the width direction (in the Z1 direction) of the second electrode plate 20, and thus the non-coated portion 21a in which the second electrode collector 21 is exposed may be formed. For example, the non-coated portion 21a of the second electrode plate 20 may be formed on the opposite side of the non-coated portion 11a of the first electrode plate 10.

The non-coated portion 21a may form a connection member 21a' (see FIG. 1) having a second polarity, wherein charges of the second electrode plate 20 may be discharged to the outside via the connection member 21a'. According to another embodiment of the present invention, an electrode tap (not shown) may further be formed on the non-coated portion 21a, and the electrode tap may form the connection member 21a' having the second polarity.

The first and second electrode plates 10 and 20 are stacked on each other by interposing the first separator 51, which prevents a short circuit between positive and negative electrodes in a boundary between the first and second electrode plates 10 and 20. The first separator 51 has a high ion permeation, and may be formed of a porous film with a mechanical strength, for example, a polymer material such as polyethylene or polypropylene.

Meanwhile, the second electrode assembly 120 may have a winding type structure in which the third and fourth electrode plates 30 and 40 having a long sheet shape are wound on in a roll form, centered around the first electrode assembly 110. A second separator 52 may be formed in the third electrode plate 30 to be electrically insulated from the first electrode assembly 110 forming a winding center. Also, a third separator 53 may be formed between the third and fourth electrode plates 30 and 40 to separate the third and fourth electrode plates 30 and 40 from each other and to prevent an internal short circuit between positive and negative electrodes.

The third and fourth electrode plates 30 and 40 and the second and third separators 52 and 53 may extend outwards in a spiral shape to surround the first electrode assembly 110 as a winding center. For example, the second electrode assembly 120 may surround the first electrode assembly 110 forming the winding center a plurality of times.

For example, the second separator 52 may form an innermost turn of the second electrode assembly 120. The second separator 52 may be wound on the first electrode assembly 110 once, and then may be wound in a spiral shape. The third electrode plate 30 disposed on the second separator 52 may face the first electrode assembly 110 by interposing the second separator 52 therebetween. The third electrode plate 30 may face the second electrode plate 20 formed on an outer surface of the first electrode assembly 110. Here, opposite polarities of the second and third electrode plates 20 and 30 may face each other so as to provide an electrical storage region of a secondary battery and increase a charging/discharging capacity of the secondary battery.

The third electrode plate 30 may include a third electrode collector 31, and a third electrode active material 35 formed on at least one surface of the third electrode collector 31. A non-coated portion 31a, in which the third electrode active material 35 is not formed, may be formed in the third electrode plate 30. The third electrode active material 35 is not formed in, for example, at least one end of the third electrode plate 30 in the width direction (in the Z1 direction) of the third electrode plate 30, and thus the non-coated portion 31a in which the third electrode collector 31 is exposed may be formed.

The non-coated portion 31a may form a connection member 31a' (see FIG. 1) having a first polarity, wherein charges of the third electrode plate 30 may be discharged to the outside via the connection member 31a'. According to another embodiment of the present invention, an electrode tap (not shown) may further be formed on the non-coated portion 31a, and the electrode tap may form the connection member 31a' having the first polarity.

The fourth electrode plate 40 may include a fourth electrode collector 41, and a fourth electrode active material 45 formed on at least one surface of the fourth electrode collector 41. A non-coated portion 41a, in which the fourth electrode active material 45 is not formed, may be formed in the fourth electrode plate 40. The fourth electrode active material 45 is not formed in, for example, at least one end of the fourth electrode plate 40 in the width direction (in the Z1 direction) of the fourth electrode plate 40, and thus the non-coated portion 41a in which the fourth electrode collector 41 is exposed may be formed. For example, the non-coated portion 41a of the fourth electrode plate 40 may be formed on the opposite side of the non-coated portion 31a of the third electrode plate 30.

The non-coated portion 41a may form a connection member 41a' (see FIG. 1) having a second polarity, wherein charges of the fourth electrode plate 40 may be discharged to the outside via the connection member 41a'. According to another embodiment of the present invention, an electrode tap (not shown) may further be formed on the non-coated portion 41a, and the electrode tap may form the connection member 41a' having the second polarity.

The second and third separators 52 and 53 prevent a short circuit between positive and negative electrodes in a boundary between the second and third electrode plates 20 and 30 facing each other of the first and second electrode assemblies 110 and 120 or between the third and fourth electrode plates 30 and 40 of the second electrode assembly 120. The second and third separators 52 and 53 have a high ion permeation, and may be formed of a porous film with a mechanical strength, for example, a polymer material such as polyethylene or polypropylene.

Figure 3:
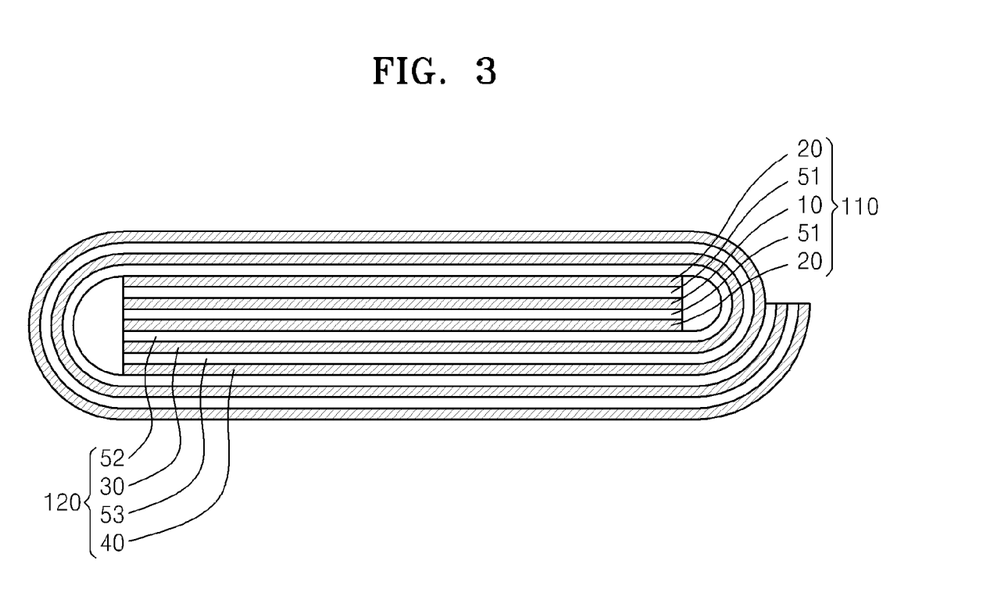
FIG. 3 is a cross-sectional view taken along a line III-III of FIG. 1.

FIG. 3 is a cross-sectional view taken along a line III-III of FIG. 1. For ease of understanding, FIG. 4 shows a reconstructed view of the cross-sectional view of FIG. 3.

Figure 4:
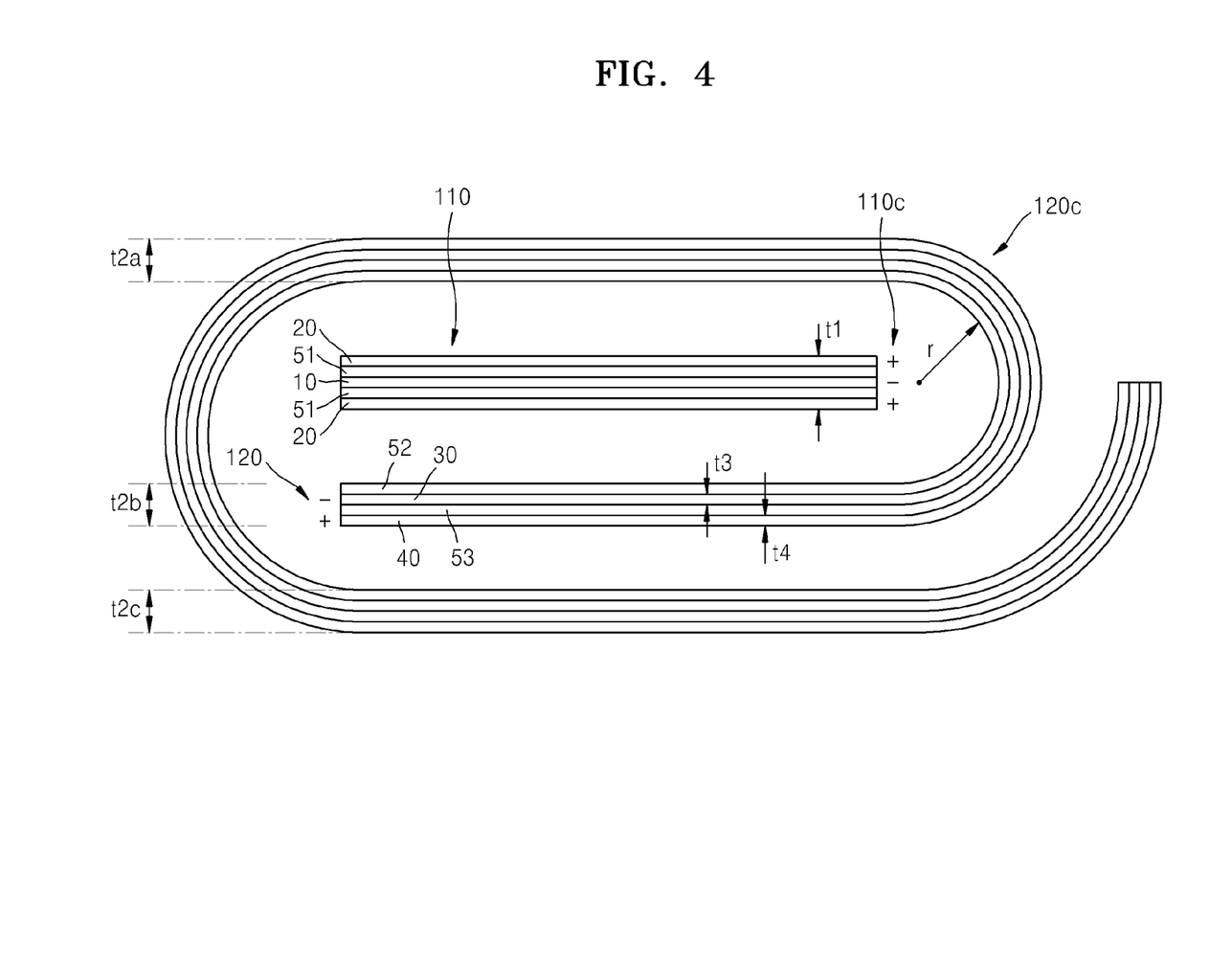
FIG. 4 is a reconstructed view of the cross-sectional view of FIG. 3 for ease of understanding.

Referring to FIG. 4, the second electrode assembly 120 is supported by the first electrode assembly 110 serving as a winding center. A curvature radius r of a corner portion 110c may vary according to a stacked thickness t1 of the first electrode assembly 110. In other words, when the second electrode assembly 120 is wound on an outer circumferential surface of the first electrode assembly 110 as the winding center, the second electrode assembly 120 may be wound along an approximately oval trace. Here, in the trace of the second electrode assembly 120, the corner portion 120c forms a minimum curvature radius r, and the corner portion 120c surrounds an edge portion 110c of the first electrode assembly 110 along the curvature radius r.

For example, the curvature radius r of the corner portion 120c is shown in FIG. 4, assuming that the corner portion 120c of the second electrode assembly 120 is formed in an approximately semicircular shape. However, this is just for convenience of description, and FIG. 4 does not necessarily show an actual shape of the second electrode assembly 120. For example, the corner portion 120c of the second electrode assembly 120 may surround the edge portion 110c of the first electrode assembly 110 according to different curvature radiuses r. Here, the corner portion 120c of the second electrode assembly 120 may be formed in a curve shape in which small circular arcs having different curvature radiuses r are combined with one another.

The curvature radius r formed by the corner portion 120c of the second electrode assembly 120 may vary according to the stacked thickness t1 of the first electrode assembly 110. In other words, the corner portion 120c of the second electrode assembly 120 forms a gentle curve with the curvature radius r increased as the stacked thickness t1 of the first electrode assembly 110 increases. As such, if the corner portion 120c is gently bent, damage of the second electrode assembly 120, for example, breakage of the third and fourth electrode plates 30 and 40 or loss of an active material, may be prevented. On the contrary, the corner portion 120c of the second electrode assembly 120 forms a sharp curve with the curvature radius r decreased as the stacked thickness t1 of the first electrode assembly 110 decreases, thereby resulting in breakage of the third and fourth electrode plates 30 and 40 or loss of an active material in the corner portion 110c. Accordingly, the first electrode assembly 110 may be formed to above an appropriate stacked thickness t1 so as to increase the curvature radius r of the second electrode assembly 120 in order to resolve various problems, for example, generation of a sharp curve of the second electrode assembly 120, breakage of the third and fourth electrode plates 30 and 40, and loss of an active material.

According to the present invention, a secondary battery having a high energy density may be provided by increasing loading levels of the third and fourth electrode plates 30 and 40, for example, weight of an active material per unit area of the third and fourth electrode plates 30 and 40. Also, even if the loading levels of the third and fourth electrode plates 30 and 40 are increased, damage of the second electrode assembly 120, for example, breakage of the third and fourth electrode plates 30 and 40 or loss of an active material, may be prevented.

Meanwhile, the stacked thickness t1 of the first electrode assembly 110 may vary according to the stacking number of the first and second electrode plates 10 and 20 and the first separator 51 that form the first electrode assembly 110. Also, the stacked thickness t1 of the first electrode assembly 110 may vary according to thicknesses of the first and second electrode plates 10 and 20 and the first separator 51.

Figure 5:
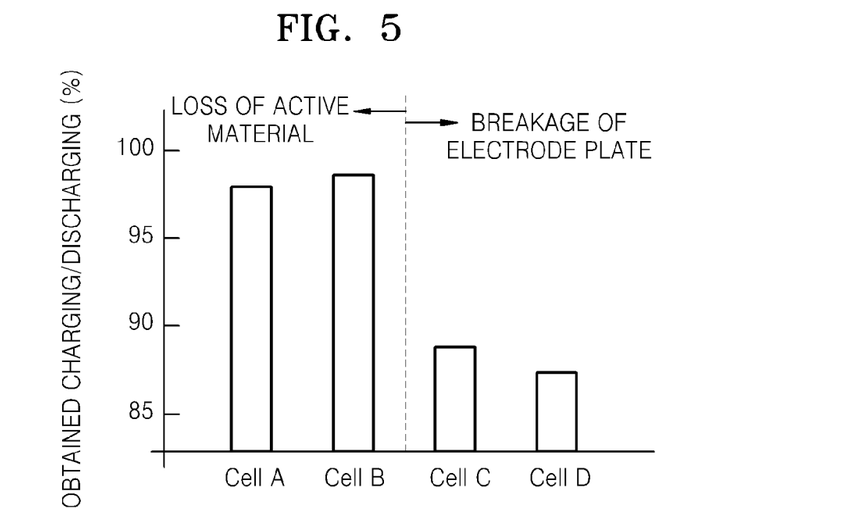
FIG. 5 is a graph showing a decrease in a charging/discharging capacity due to damage of a second electrode assembly according to an embodiment of the present invention.

FIG. 5 is a graph showing a decrease in a charging/discharging capacity due to damage of the second electrode assembly 120 according to an embodiment of the present invention. FIG. 5 shows a decrease in an actually obtained charging/discharging capacity with respect to an originally designed charging/discharging capacity due to loss of the active material and breakage of the third and fourth electrode plates 30 and 40, targeting various secondary batteries, that is, a cell A, a cell B, a cell C, and a cell D. Regarding the loss of the active material, about 97% of the charging/discharging capacity is shown. Regarding the breakage of the third and fourth electrode plates 30 and 40, about 87% of the charging/discharging capacity is shown. For example, the second electrode assembly 120 may be wound on the outer circumferential surface of the first electrode assembly 110 and then may be pressed through pressurization. The breakage of the third and fourth electrode plates 30 and 40 causes a more significant decrease in the charging/discharging capacity compared to a partial loss of the active material, and this breakage may occur during the pressurization of the second electrode assembly 120.

In an embodiment of the present invention, a sharp curve of the second electrode assembly 120 may be prevented by using the first electrode assembly 110 formed to above an appropriate stacked thickness t1, thereby preventing a decrease in the charging/discharging capacity due to breakage of the third and fourth electrode plates 30 and 40 or loss of the active material.

Referring to FIG. 4, the stacked thickness t1 of the first electrode assembly 110 may be determined based on thicknesses t3 and t4 of the third and fourth electrode plates 30 and 40 of the second electrode assembly 120. For example, the stacked thickness t1 of the first electrode assembly 110 may be increased to correspond to the thicknesses t3 and t4 of the third and fourth electrode plates 30 and 40 of the second electrode assembly 120. This is because as the thicknesses t3 and t4 increase, the second electrode assembly 120 may not be flexibly deformed and also if the corner portion 120c is forced to be deformed, breakage of the third and fourth electrode plates 30 and 40 or loss of the active material may occur. In other words, the stacked thickness t1 of the first electrode assembly 110 (hereinafter, referred to as a stacked thickness) may be determined according to the thicknesses t3 and t4 of the third and fourth electrode plates 30 and 40 (hereinafter, referred to as electrode plate thicknesses) of the second electrode assembly 120. In detail, a minimum stacked thickness t1 required according to the electrode plate thicknesses t3 and t4 may vary.

Figure 6:
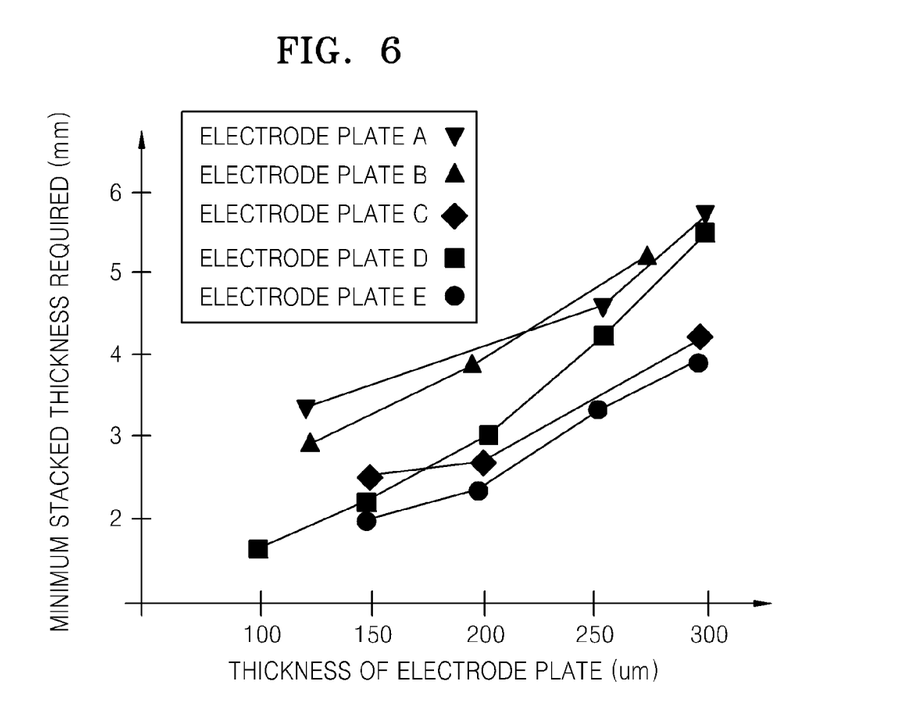
FIG. 6 is a graph showing a minimum stacked thickness required according to a thickness of an electrode plate according to an embodiment of the present invention.

FIG. 6 is a graph showing the minimum stacked thickness t1 required according to the electrode plate thicknesses t3 and t4 according to an embodiment of the present invention. FIG. 6 shows a result of measuring the minimum stacked thickness t1 required according to the electrode plate thicknesses t3 and t4 with respect to various electrode plates, that is, an electrode plate A, an electrode plate B, an electrode plate C, an electrode plate D, and an electrode plate E. Types of electrode collectors and types of electrode active material are different according to types of electrode plates, and thus the minimum stacked thickness t1 required to prevent damage of the second electrode assembly 120 may vary. However, in all types of electrode plates, a lower limit of the stacked thickness t1 increases as the electrode plate thicknesses t3 and t4 increase. In general, the stacked thickness t1 increases in proportion to the electrode plate thicknesses t3 and t4. For example, the minimum stacked thickness t1 of the first electrode assembly 110 may correspond to the electrode plate thicknesses t3 and t4 of the second electrode assembly 120, that is, to about ten to thirty times the thickness t3 of the third electrode plate 30 or the thickness t4 of the fourth electrode plate 40.

As such, as the stacked thickness t1 of the first electrode assembly 110 increases, the curvature radius of the second electrode assembly 120 surrounding the outer circumferential surface of the first electrode assembly 110 increases, and thus the second electrode assembly 120 may be prevented from being damaged. However, considering charging/discharging efficiency, although the edge portions 110c formed in two sides of the first electrode assembly 110 may not provide an electrical storage region, the second electrode assembly 120 may provide an electrical storage region where the third and fourth electrode plates 30 and 40 having opposite polarities face each other throughout the entire oval trace. In this regard, the second electrode assembly 120 contributes more to charging/discharging efficiency than the first electrode assembly 110. Also, the stacked thickness t1 of the first electrode assembly 110 may be limited to a range in which the second electrode assembly 120 may be prevented from being damaged. In other words, the stacked thickness t1 of the first electrode assembly 110 may be less than thicknesses t2a, t2b, and t2c of the second electrode assembly 120. Here, the thicknesses t2a, t2b, and t2c of the second electrode assembly 120 refer to the sum of the thicknesses t2a, t2b, and t2c of the second electrode assembly 120 in a stacking direction of the first electrode assembly 110. For example, the stacked thickness t1 of the first electrode assembly 110 may be formed to correspond to about one-fifth times to one-twentieth times the thicknesses t2a, t2b, and t2c of the second electrode assembly 120. In detail, the stacked thickness t1 of the first electrode assembly 110 may be about 30 to 40 mm, and the thicknesses t2a, t2b, and t2c of the second electrode assembly 120 may be about 150 to 800 mm.

Figure 7:
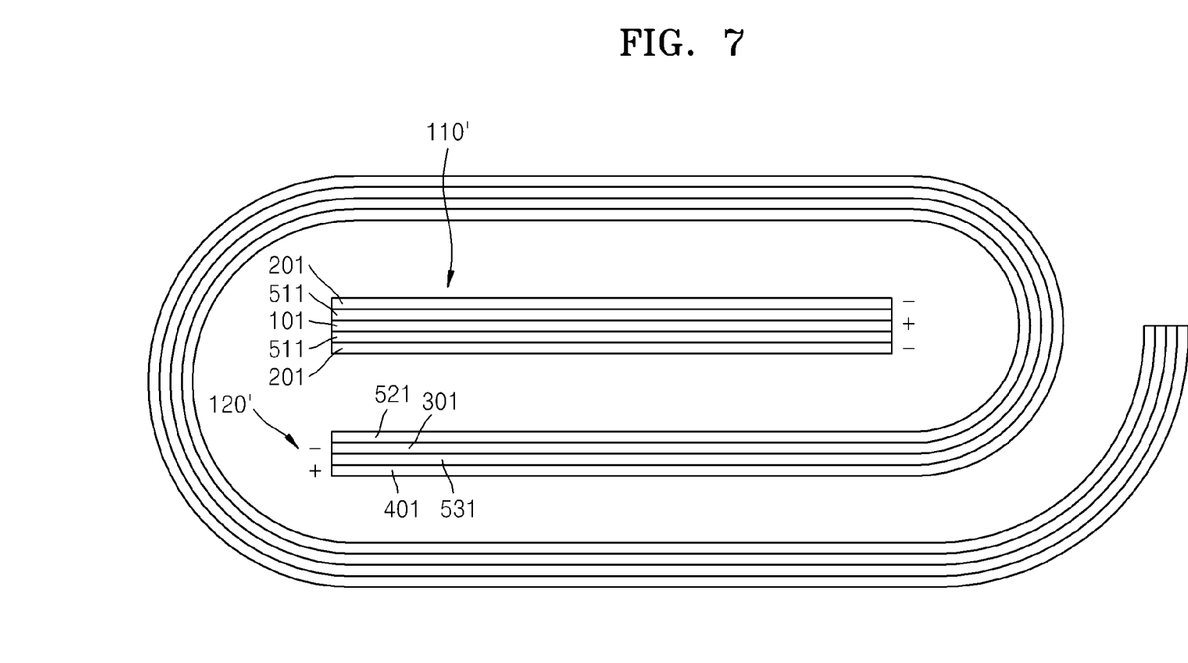
FIGS. 7 and 8 are cross-sectional views of a secondary battery according to other embodiments of the present invention.
Figure 8:
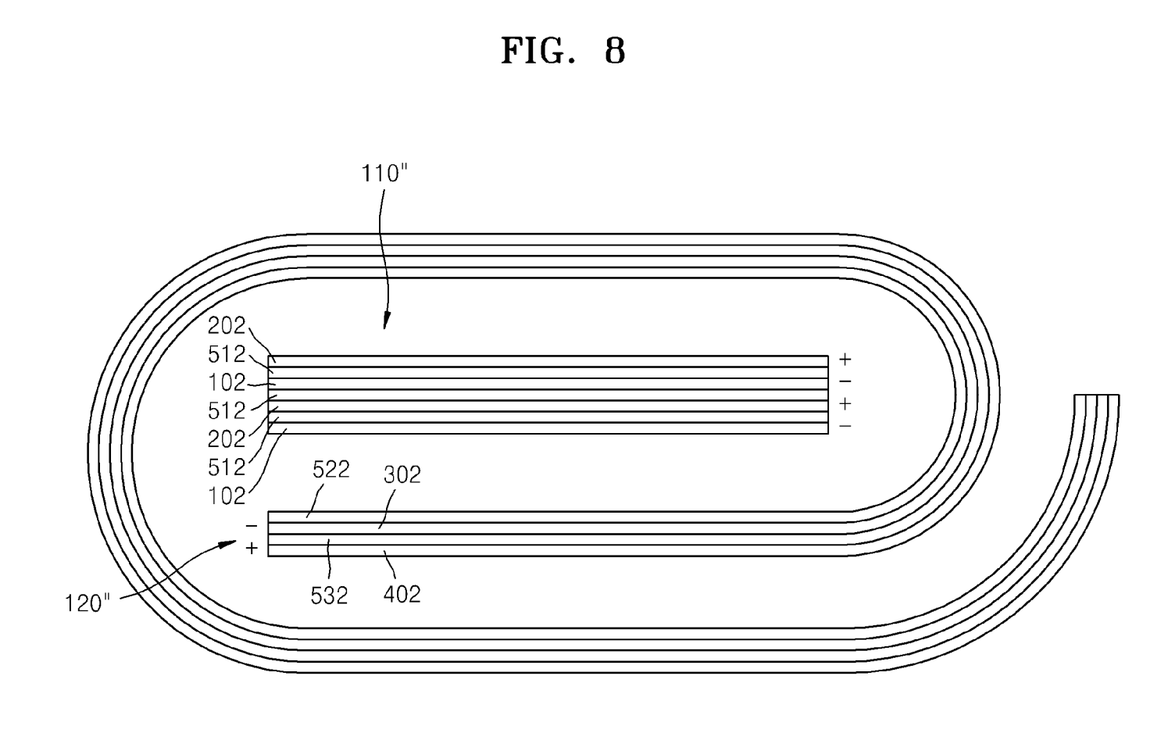

FIGS. 7 and 8 are cross-sectional views of a secondary battery according to other embodiments of the present invention. Hereinafter, various embodiments regarding arrangement of polarities between the FIGS. 7 and 8 are cross-sectional views of a secondary battery according to other embodiments of the present invention will be described.

Referring to FIGS. 4, 7, and 8, second and third electrode plates 20, 30, 201, 301, 102, 202, and 302 face first and second electrode assemblies 110, 120, 110', 120', 110", and 120" such that the same polarities or opposite polarities may face each other. Here, the present invention is not limited to a case where the second and third electrode plates 20, 30, 201, 301, 102, 202, and 302 contact one another. Thus, the second and third electrode plates 20, 30, 201, 301, 102, 202, and 302 may be separated from each other by interposing separators 52, 521, and 522 of the first and second electrode assemblies 110, 120, 110', 120', 110", and 120" or a separate insulating film (not shown) therebetween.

In the embodiment shown in FIG. 4, the second and third electrode plates 20 and 30 facing each other of the first and second electrode assemblies 110 and 120 may be disposed such that opposite polarities face each other, thereby increasing an electrical storage region and increasing a charging/discharging capacity of the secondary battery.

For example, electrode plates having the same polarity, that is, the second electrode plates 20, may be respectively disposed on both surfaces of the first electrode assembly 110, and an electrode plate, that is, the third electrode plate 30, for forming an internal turn of the second electrode assembly 120 may be disposed to have an opposite polarity to the second electrode plate 20, thereby forming a cell structure in which charges may be accumulated in a boundary between the first and second electrode assemblies 110 and 120. Here, an internal short circuit between positive and negative electrodes may be prevented by interposing the second separator 52 in a boundary between the second electrode plate 20 of the first electrode assembly 110 and the third electrode plate 30 of the second electrode assembly 120.

For example, the second electrode plate 20 may be formed as a positive electrode, and the third electrode plate 30 facing the second electrode plate 20 may be formed as a negative electrode in consideration of a ratio of an area of the positive electrode to an area of the negative electrode. Here, the secondary battery may be designed to satisfy a condition that a positive electrode area is narrower than a negative electrode area to prevent precipitation of lithium in the negative electrode and to achieve stability of the secondary battery during to charging and discharging operations. In other words, an area of the third electrode plate 30 surrounding the entire first electrode assembly 110, that is, areas of negative electrodes, may be formed to be larger than areas of the second electrode plates 20, that is, areas of positive electrodes, formed on both the surfaces of the first electrode assembly 110.

In the embodiment shown in FIG. 7, the second and third electrode plates 201 and 301 facing each other of the first and second electrode assemblies 110' and 120' may be disposed such that the same polarities face each other, thereby preventing an internal short circuit between the first and second electrode assemblies 110' and 120' and increasing stability of the secondary battery.

For example, electrode plates having the same polarity, that is, the second electrode plates 201, may be respectively disposed on both surfaces of the first electrode assembly 110', and an electrode plate, that is, the third electrode plate 301, for forming an internal turn of the second electrode assembly 120' may be disposed to have the same polarity, e.g., a negative electrode, thereby preventing an internal short circuit between positive and negative electrodes in a boundary between the first and second electrode assemblies 110' and 120'.

For example, a second separator 521 may be interposed between the second and third electrode plates 201 and 301 facing each other of the first and second electrode assemblies 110' and 120' to prevent an internal short circuit between positive and negative electrodes. However, the above-described structure of the secondary battery may be used to decrease risk of a short circuit due to, for example, thermal contraction. Meanwhile, in FIG. 7, a reference numeral 511 denotes a first separator between the first and second electrode plates 101 and 201, and a reference numeral 531 denotes a third separator between the third and fourth electrode plates 301 and 401.

In the embodiment shown in FIG. 8, the electrode plates 102, 202, and 302 facing one another of the first and second electrode assemblies 110" and 120" may be disposed such that the same polarities face each other at one side and different polarities face each other at the other side. For example, if the first and second electrode plates 102 and 202 having opposite polarities are disposed on opposite surfaces of the first electrode assembly 110'', the first and third electrode plates 102 and 302 having the same polarity face each other at one side of the first electrode assembly 110'', and the second and third electrode plates 202 and 302 having opposite polarities face each other at the other side of the first electrode assembly 110''. For example, the above-described structure may be used when an internal short circuit may occur at any one side of the first electrode assembly 110'' according to arrangement of the secondary battery. Meanwhile, in FIG. 8, a reference numeral 512 denotes a first separator interposed between the first and second electrode plates 102 and 202, a reference numeral 522 denotes a second separator interposed between the second and third electrode plates 202 and 302, and a reference numeral 532 denotes a third separator interposed between the third and fourth electrode plates 302 and 402.

Figure 9:
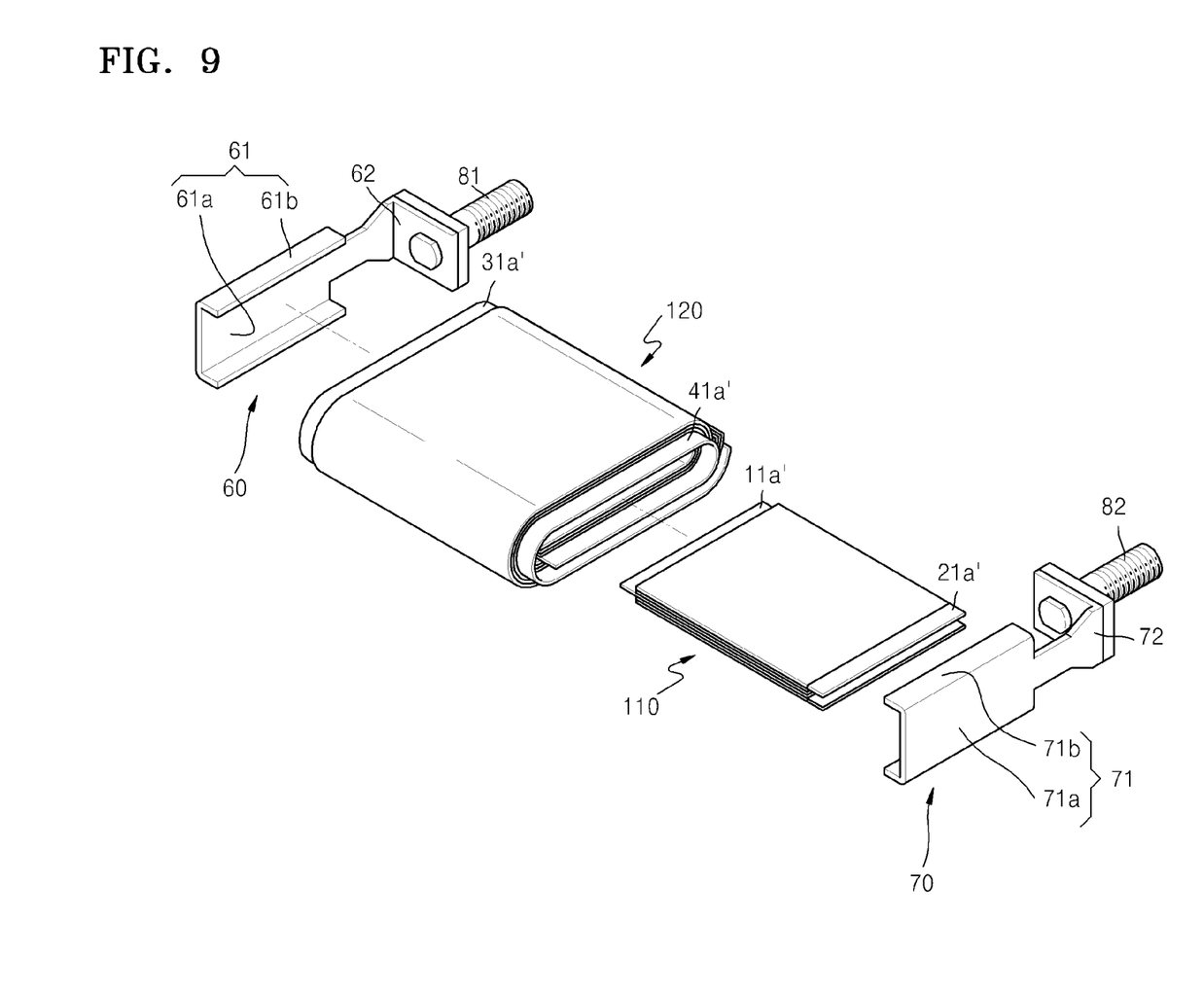
FIG. 9 is a view for describing a connected structure between the secondary battery of FIG. 1 and electrode terminals.

FIG. 9 is a view for describing a connected structure between the secondary battery of FIG. 1 and first and second electrode terminals 81 and 82.

Referring to FIG. 9, charges generated through electrochemical reaction between the first and second electrode assemblies 110 and 120 may be discharged to the outside through the connection members 11a' and 31a' having the first polarity and respectively formed at each one side of the first and second electrode assemblies 110 and 120 and the connection members 21a' and 41a' having the second polarity and respectively formed at opposite sides of the first and second electrode assemblies 110 and 120. A first collecting member 60 may be connected to the connection members 11a' and 31a' having the first polarity, and a second collecting member 70 may be connected to the connection members 21a' and 41a' having the second polarity, and thus a charging/discharging path of the secondary battery may be formed.

The connection members 11a' and 31a' having the first polarity may include the connection members 11a' and 31a' drawn from the first and second electrode assemblies 110 and 120, for example, non-coated portions of the first and third electrode plates 10 and 30. The connection members 11a' and 31a' drawn from the first and second electrode assemblies 110 and 120 may overlap with each other and may be connected to the first collecting member 60 to be concentrated in the collecting member 60.

The connection members 21a' and 41a' having the second polarity may include the connection members 21a' and 41a' drawn from the first and second electrode assemblies 110 and 120, for example, non-coated portions of the second and fourth electrode plates 20 and 40. The connection members 21a' and 41a' drawn from the first and second electrode assemblies 110 and 120 may overlap with each other and may be connected to the second collecting member 70 to be concentrated in the second collecting member 70.

The first and second electrode assemblies 110 and 120 and the first and second electrode terminals 81 and 82 are electrically connected via the first and second collecting members 60 and 70. In detail, the first collecting member 60 may include a current collecting unit 61 connected to the first and second electrode assemblies 110 and 120, and a lead unit 62 connected to the first electrode terminal 81. Also, the second collecting member 70 may include a current collecting unit 71 connected to the first and second electrode assemblies 110 and 120, and a lead unit 72 connected to the second electrode terminal 82.

The current collecting units 61 and 71 may be coupled to both side portions of the electrode assemblies 110 and 120 to cover both side portions thereof. The current collecting unit 61 may include a base portion 61a coupled to the side portions of the connection members 11a' and 31a' by welding, and bending portions 61b bent to face at both sides of the base portion 61a and coupled to the side portions of the connection members 11a' and 31a' by welding. Also, the current collecting unit 71 may include a base portion 71a coupled to side portions of the connection members 21a' and 41a' by welding, and bending portions 71b bent to face at both sides of the base portion 71a and coupled to the side portions of the connection members 21a' and 41a' by welding. The bending portions 61b may be formed to press the connection members 11a' and 31a' in a concentrated manner, and may be coupled to the connection members 11a' and 31a' by welding. Also, the bending portions 71b may be formed to press the connection members 21a' and 41a' in a concentrated manner, and may be coupled to the connection members 21a' and 41a' by welding. For example, the current collecting units 61 and 71 and the first and second electrode assemblies 110 and 120 may be coupled to each other by welding using laser or ultrasonic waves.

The current collecting units 61 and 71 and the first and second electrode terminals 81 and 82 may be electrically connected via the lead units 62 and 72, respectively. For example, the lead units 62 and 72 may extend toward the first and second electrode terminals 81 and 82 from the current collecting units 61 and 71, respectively. The lead units 62 and 72 may be formed to be bent to face the first and second electrode terminals 81 and 82, respectively. Here, the first and second electrode terminals 81 and 82 and the lead units 62 and 72 may be coupled to each other by welding, respectively.

Figure 10:
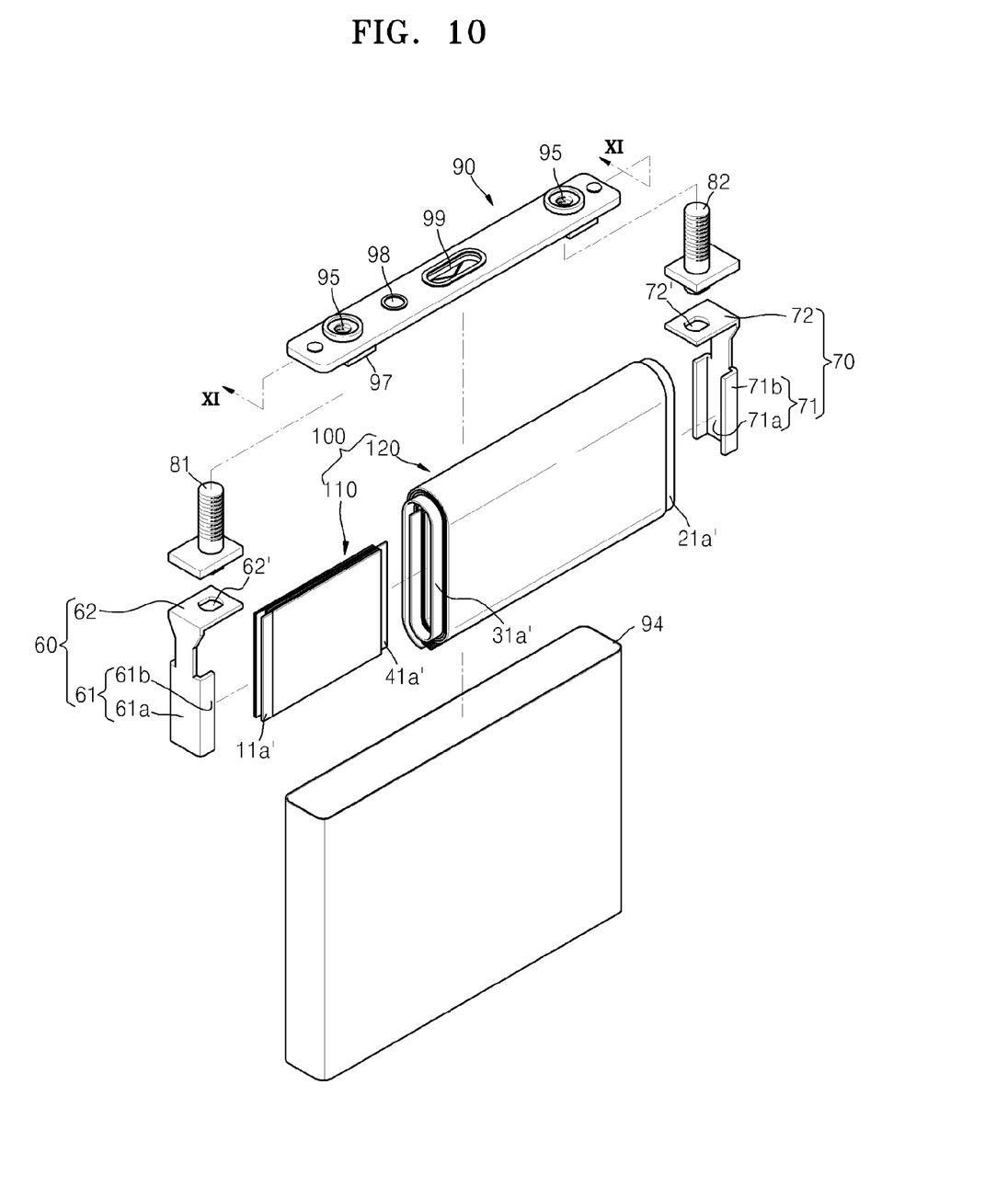
FIG. 10 is an exploded perspective view of a secondary battery according to another embodiment of the present invention.
Figure 11:
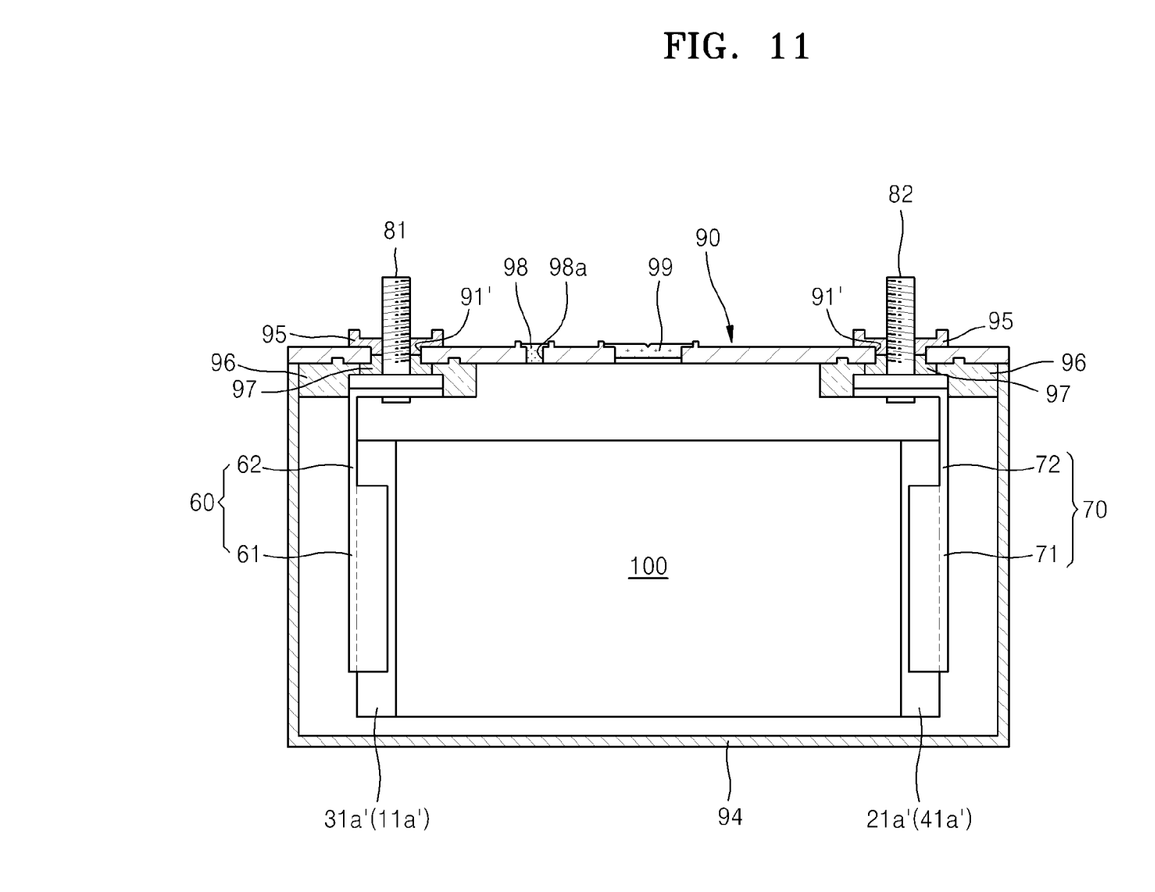
FIG. 11 is a cross-sectional view taken along a line XI-XI of the secondary battery of FIG. 10.

FIG. 10 is an exploded perspective view of a secondary battery according to another embodiment of the present invention. FIG. 11 is a cross-sectional view taken along a line XI-XI of the secondary battery of FIG. 10.

Referring to FIGS. 10 and 11, the secondary battery may include an electrode assembly 100, a case 94 for accommodating the electrode assembly 100, and a cap plate 90 for closing a top portion of the case 94.

The electrode assembly 100 may include the first electrode assembly 110, and the second electrode assembly 120 wound on an outer circumferential surface of the first electrode assembly 110. The first electrode assembly 110 may be formed to have a stacked-type structure, and the second electrode assembly 120 may be formed to have a winding-type structure. For example, the connection members 11a' and 31a' having a first polarity and the connection members 21a' and 41a' having a second polarity may be formed at opposite sides of the electrode assembly 100. Details about the first and second electrode assemblies 110 and 120 are substantially identical or similar to that described above, and thus a repeated description thereof will be omitted.

The connection members 11a' and 31a' having the first polarity and respectively drawn from the first and second electrode assemblies 110 and 120 may be electrically connected to the first collecting member 60. The connection members 21a' and 41a' having the second polarity and respectively drawn from the first and second electrode assemblies 110 and 120 may be electrically connected to the second collecting member 70.

The first collecting member 60 may include a current collecting unit 61 connected to the electrode assembly 100, and a lead unit 62 connected to the first electrode terminal 81. Also, the second collecting member 70 may include a current collecting unit 71 connected to the electrode assembly 100, and a lead unit 72 connected to the second electrode terminal 82. The current collecting units 61 and 71 may be coupled to both side portions of the electrode assembly 100 to cover both the side portions thereof. The current collecting unit 61 may include the bending portions 61*b* bent to face at both sides of the base portion 61*a* and to cover the connection members 11*a*' and 31*a*'. The current collecting unit 71 may include the bending portions 71*b* bent to face at both sides of the base portion 71*a* and to cover the connection members 21*a*' and 41*a*'. The current collecting units 61 and 71 and the first and second electrode terminals 81 and 82 may be electrically connected via the lead units 62 and 72, respectively. The lead units 62 and 72 may extend toward the first and second electrode terminals 81 and 82 from the current collecting units 61 and 71, respectively. The lead units 62 and 72 may be formed to be bent to face the first and second electrode terminals 81 and 82, respectively. A terminal hole 62' into which the first electrode terminal 81 is inserted may be formed in a part of the lead unit 62. A terminal hole 72' into which the second electrode terminal 82 is inserted may be formed in a part of the lead unit 72. The lead units 62 and 72 and the first and second electrode terminals 81 and 82 may be coupled to each other along boundaries thereof, respectively.

Referring to FIG. 11, the cap plate 90 may be disposed on the top portion of the case 94 accommodating the electrode assembly 100 to close the case 94. A portion where the cap plate 90 and the case 94 contact each other may include an air tight seal produced by a laser welding technique. A safety vent 99 may be formed in the cap plate 90 to be broken if internal pressure of the case 94 exceeds a predetermined level, thereby providing a path through which a gas may be discharged. Also, an electrolyte inlet 98*a* for injecting an electrolyte (not shown) into the case 94 may be formed in the cap plate 90. The electrolyte inlet 98*a* may be may be closed by a sealing cork 98 after the injection of the electrolyte is finished.

A terminal hole 91' through which the first and second electrode terminals 81 and 82 are drawn to the outside may be formed in the cap plate 90. The first and second electrode terminals 81 and 82 may be coupled to the cap plate 90 in an insulated manner. The first and second electrode terminals 81 and 82 and the cap plate 90 may be insulated from each other by interposing upper and lower insulating gaskets 95 and 97 therebetween. For example, the lower insulating gasket 97 is disposed to be inserted into the terminal hole 91' from below, and the upper insulating gasket 95 is disposed to be inserted into the terminal hole 91' from above. An insulating sealing material 96 may further be disposed to insulate the first and second electrode terminals 81 and 82 and the cap plate 90 from each other or the first and second electrode terminals 81 and 82 and the case 94 from each other.

According to the one or more embodiments of the present invention, an internal electrode plate near a winding center may be prevented from being damaged by using an electrode assembly in which a stacked-type electrode assembly and a winding-type electrode assembly are combined, thereby providing a secondary battery having a high energy density.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A secondary battery, comprising;
a first electrode assembly including a first electrode plate, a first separator and a second electrode plate sequentially stacked on each other, the first and second electrode plates being both flat rectangular sheets; and
a second electrode assembly including a second separator and third and fourth electrode plates wound together about an outer circumference of the first electrode assembly, the second separator being an only barrier that prevents the second electrode assembly from being shorted with the first electrode, assembly by electrically insulating the third and fourth electrode plates from the first and second electrode plates.

2. The secondary battery of claim 1, wherein the second separator forms an innermost turn of the second electrode, assembly to surround the outer circumference of the first electrode assembly, and the third electrode plate and the fourth electrode plate are sequentially disposed on the outside of the second separator, wherein the second electrode assembly further comprises a third separator interposed between the third and fourth electrode plates.

3. The secondary battery of claim 1, wherein a corner portion of the second electrode assembly surrounds an edge portion of the first electrode assembly, and a minimum curvature radius is formed throughout the entire trace of the second electrode assembly.

4. The secondary battery of claim 1, wherein the stacked thickness of the first electrode assembly is less than a thickness of the second electrode assembly.

5. The secondary battery of claim 4, wherein the thickness of the second electrode assembly corresponds to the sum of partial thicknesses of the second electrode assembly in a stacking direction of the first electrode assembly.

6. The secondary battery of claim 1, wherein each of the first and second electrode assemblies comprise, connection members having as first polarity arranged at a first side of the secondary battery and connection members having a second and opposite polarity arranged at a second and opposite side of the secondary battery.

7. The secondary battery of claim 6, wherein the first and second electrode assemblies are connected to each other in parallel by commonly binding together the connection members haying the first polarity of the first and second electrode assemblies at the first side of the secondary battery, and by commonly binding together the connection members having the second and opposite polarity of the first and second electrode assemblies at the second and opposite side of the secondary battery.

8. The secondary battery of claim 6, wherein the connection members having the first polarity comprise:
a non-coated portion of the first electrode plate arranged at the first side of the secondary battery; and
a non-coated portion of the third electrode plate arranged at the first side of the secondary battery.

9. The secondary battery of claim 8, wherein the connection members haying the second polarity comprise:
a non-coated portion of the. second electrode plate arranged at the second and opposite side of the secondary battery; and
a non-coated portion of the fourth electrode plate arranged at the second and opposite side of the secondary battery.

10. The secondary battery of claim 6, further comprising:
a first collecting member coupled to the connection members having the first polarity; and
a second collecting member coupled to the connection members having the second polarity.

11. The secondary batter of claim 10 further comprising:
a case accommodating the first and second electrode assemblies;
a first electrode terminal that is electrically connected to the first collecting member and is drawn outside of the ease; and a second electrode terminal that is electrically connected to the second collecting member and is drawn outside of the case.

12. The secondary battery of claim 1, the second separator being a single continuous polymer sheet that includes a first portion and a second portion, wherein the third and fourth electrodes of the second electrode assembly being separated from the first and second electrodes of the first electrode assembly by only the first portion of the second separator, the second portion electrically isolating, the third electrode, plate. from the fourth electrode plate.

13. The secondary battery of claim 1, wherein the first through fourth electrode plates include connection members that. protrude beyond the first and second separators at both a top and a bottom of the first and second electrode assemblies.

14. The secondary battery of claim 1, the second separator being coextensive with the third and fourth electrode plates and including a portion that is interposed between a portion of the third electrode plate and a portion of the fourth electrode plate.

15. The secondary battery of claim 1, the second separator includes a first side and a second and opposite side, wherein the second separator includes a portion that is interposed between a portion of the third electrode plate and a portion of the fourth electrode plate, said first side of said portion of the second separator being in direct contact with the portion of the third electrode plate, and the second and opposite side of the portion of the second separator being in direct contact with the portion of the fourth electrode plate.

16. The secondary battery of claim 1, wherein portions of the third and fourth electrode plates are flat.

17. A secondary battery, comprising:
a first electrode assembly including first and second electrode plates stacked on each other; and
a second electrode assembly including third and fourth electrode plates, wherein the second electrode assembly is wound along art outer circumference of the first electrode assembly, wherein a minimum stacked thickness of the first electrode assembly is formed to correspond to about ten to thirty times an electrode plate thickness of an average of the third electrode plate and the fourth electrode plate of the second electrode assembly, the second electrode assembly further comprises a separator wound together with the third and fourth electrode plates, the separator being an innermost winding of the second electrode assembly, the separator being an only barrier between the first and second electrode plates of the first electrode assembly and the third and fourth electrode plates of the second electrode assembly, the separator being comprised of as material selected from a group consisting of polyethylene and polypropylene.

18. A secondary battery, comprising:
stacked-type electrode assembly including first electrode plate, a first separator sheet, a second electrode plate and a second separator sheet sequentially stacked, each of the first and second electrode plates and the first and second separator sheets being of a rectangular shape, being flat; and
a wound, spiral-type electrode assembly including a third separator sheet, a third electrode plate, a fourth separator sheet and a fourth electrode plate sequentially stacked on each other and wound about an outer circumference of the stacked-type electrode assembly, wherein a minimum stacked thickness of the stacked-type electrode assembly is from 10 to 30 times an average of a thickness of the third electrode plate and the fourth electrode plate, wherein the third and fourth electrodes of the second electrode assembly being separated from the first and second electrodes of the first electrode assembly by only the third separator sheet, the third separator sheet being a polymer separator.

19. The secondary battery of claim 18, wherein the third separator sheet is a single continuous sheet that includes a first portion and a second portion, the first portion electrically insulating the wound spiral-type electrode assembly from the stacked-type electrode assembly, the second portion electrically insulating the third electrode plate from the fourth electrode plate.

20. The secondary battery of claim 18, wherein portions of the third and fourth electrode plates are flat.

* * * * *